Feb. 11, 1969  W. J. NELSON  3,426,791

SLOSH ALLEVIATOR

Filed March 8, 1967

INVENTOR
WALLACE J. NELSON

BY

ATTORNEYS

United States Patent Office 3,426,791
Patented Feb. 11, 1969

3,426,791
SLOSH ALLEVIATOR
Wallace J. Nelson, Hampton, Va., assignor to the United States of America as represented by the Administrator of the National Aeronautics and Space Administration
Filed Mar. 8, 1967, Ser. No. 621,714
U.S. Cl. 137—582       7 Claims
Int. Cl. E03c 1/18

ABSTRACT OF THE DISCLOSURE

The combination of a liquid container adapted to transport liquid from one site to another and a floating slosh and swirl alleviator carried on the surface of the liquid wherein a retention mechanism will maintain and guide the floating slosh alleviator on the liquid surface as the surface moves relative to the top of the tank and will minimize liquid vibration, agitation, slosh and swirl when shock inducing forces are imparted to the container and as the liquid is drained therefrom.

---

The invention described herein was made by an employee of the United States Government and may be manufactured and used by or for the Government of the United States without payment of any royalties thereon or therefor.

This invention relates to a slosh and swirl alleviator system for damping the slosh and swirl normally occurring in a liquid container as the container is transported from one site to another and as the liquid is drained from the container. The invention relates, in particular, to a system for inhibiting liquid propellant vibrations, agitation, slosh and swirl when shock-inducing forces are imparted to the tanks of liquid propellant rockets and as the liquid propellant is consumed therefrom during rocket flight.

Liquid sloshing is somewhat of a problem in transporting of any liquid material from one site to another and is a particular problem in liquid-propellant rockets wherein sloshing of the liquid against the tank wall can cause the rocket to deviate from its normal course of flight and may impair or nullify an otherwise successful space mission. In addition, in liquid propellant rockets, as in most liquid containers, as the liquid is drained from the bottom of the container and, in particular when the liquid supply becomes relatively low, the movement of the liquid tends to be in a somewhat circular or swirling motion which motion is transmitted throughout the liquid remaining in the tank and exerts a turning moment to the tank. Although liquid swirl is normally a minor problem, it is quite an important factor to be considered in long-range space missions where a slight turning moment imparted to the tank of the liquid propellant rocket might cause the space vehicle to deviate from its programmed course of flight.

Presently, the use of bulky and heavy slosh baffles attached to liquid fuel tank sidewalls at various stations along the length of the fuel tanks have proved quite adequate to alleviate or dampen liquid fuel sloshing but at a severe weight penalty. As liquid fuel drains from the tank the baffles above the liquid surface cease to function as they are no longer in contact with the fuel and the installation of a sufficient number of baffles to a large liquid rocket tank adds excess weight which, in turn, reduces the rocket payload capability. In addition, the baffles of this type that are positioned far below the surface of the liquid are of little value until the fuel level reaches them since the slosh modes are more prevalent along the surface of the liquid.

Another prior art system for damping or controlling slosh of liquid in a container has involved capping of the liquid with complex and weighty controls being employed to maintain the cap in position as the liquid level changes. Other prior art systems for damping and controlling liquid fuel slosh in liquid fuel rocket tanks have employed floating damper cage arrangements including flexible washer-like baffles projecting inward from the cage and movable with a retarding motion of the liquid fuel, and a plurality of floating cap arrangements with submerged baffles extending from the floating cap. Although each of these prior art devices has proved adequate for the purposes intended, the inherent disadvantages thereof, in some of them from a weight standpoint, and in others in the free movability of the floating arrangements and no provisions therein to adequately control or inhibit liquid swirl, demonstrates the need in the art of a simple, lightweight and efficient slosh and swirl damping system which may be useful for liquid propellant rockets and the like.

Accordingly, it is an object of the present invention to provide a lightweight, reliable system for alleviating liquid slosh and swirl normally caused by vehicular movement and drainage of the liquid from the tank.

Another object of the present invention is the provision of a floating slosh and swirl alleviator system for liquid propellant rockets wherein slosh modes will be damped at all fuel levels and the floating baffle arrangement is always prevented from moving above the normal surface level of the liquid fuel.

Another object of the present invention is the provision of a simple, lightweight retention mechanism employable with a floating slosh alleviator for liquid fuel rockets.

Another object of the present invention is a simple, lightweight and easily manufactured and reliable slosh and swirl alleviator system for liquid propellant rocket tanks.

A further object of the present invention is a slosh and swirl alleviator system wherein swirl modes induced in the liquid fuel as the fuel is consumed are minimized.

According to the present invention the foregoing and other objects are attained by providing, in combination with a liquid fuel tank, a slosh and swirl alleviator unit adapted to remain on the surface of the liquid fuel at all fuel levels. The slosh and swirl alleviator unit of the present invention is provided with structure along the circumference thereof to act in combination with structure provided on the interior of the fuel tank that permits free movement of the slosh and swirl alleviator unit as the quantity of liquid fuel in the tank decreases due to consumption, or the like, but inhibits reverse movement of the alleviator unit when shock-inducing forces are imparted to the fuel tank. This combined or coacting structure on the alleviating unit and fuel tank, in one embodiment of the present invention, is in the form of a number of integral tabs extending from the circumference of the alleviating unit and engaging a like number of grooves disposed in the sidewall of the tank. The interior of the longitudinal grooves extending throughout the length of the fuel container, in one embodiment of the present invention, is provided with a suitable rack or ratch arrangement with the points thereof directed toward the base of the fuel tank. The end portions of each of the individual tabs on the slosh alleviator unit may also be provided with sharp serrated edges adapted to freely slide by the rack as the fuel level is reduced in the tank but in the event shock-inducing forces are imparted to the tank so as to tend to slosh the liquid fuel, the motion thereof will cause the tabs to be cammed into engagement with the side walls of the tank grooves and thereby prevent reverse movement of the slosh alleviator. Thus, the slosh alleviator unit of the present invention acts essentially as a cap for the liquid to thereby inhibit liquid vibrations, agitations or slosh.

At the discharge port of the liquid fuel tank, at least a pair of vertically extending projections or fingers are disposed at diametrically opposed stations about the port and extend into the tank cavity for a short distance. These projections or fingers tend to limit the movement of the liquid fuel passing through the discharge port to the two side areas thereof and thereby inhibit any initial swirling motion being imparted to the liquid. The slosh alleviating unit is designed with suitable openings extending therethrough so as to accommodate the projections or fingers therein when the liquid level is reduced to such an extent that the slosh alleviating unit is in proximity to the projecting fingers.

In another embodiment of the present invention an additional swirl inhibiting arrangement is provided by constructing the groove surfaces along the interior of the fuel tank in a spiral fashion. In this respect, although the direction of swirl normally cannot be predicted, any tendency of liquid swirl would act against the submerged portion of the slosh alleviator which would retard the swirl motion or otherwise cause the slosh alleviator to spin. Inasmuch as the slosh alleviator is prevented from spinning more than that permitted by the tab engagement with the tank grooves, the direction of swirl would naturally be converted to the direction of the grooves with the movement of the slosh alleviator. The swirled liquid would then follow the course of least resistance, this course being dictated by the direction of the grooves in the fuel tank. Since the direction and amount of swirling movement imparted by the depleting fuel can thus be predicted, it is a simple matter to make appropriate compensation in the flight program to offset this force. A more complete appreciation of the invention and many of the inherent advantages thereof will be more clearly understood by reference to the following detailed description when considered with the accompanying drawings wherein:

Figure 1:
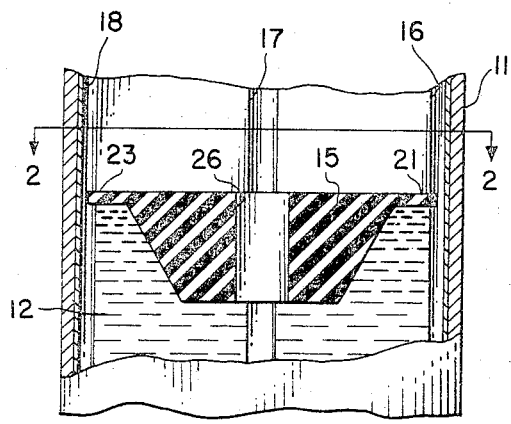
FIG. 1 is a part sectional view of a liquid container or fuel tank for use with the slosh alleviator system of the present invention.
Figure 4:
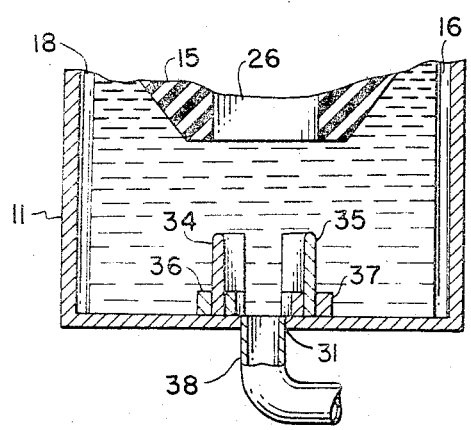
Figure 5:
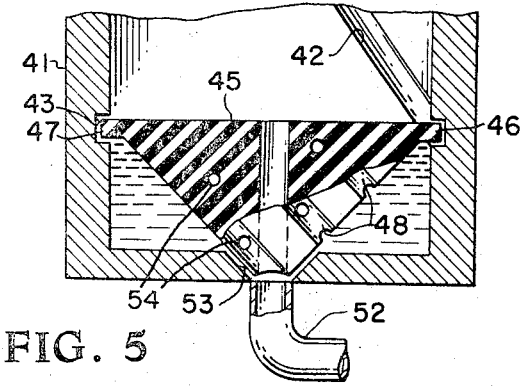

FIG. 4 is a broken, part sectional view of the tank and slosh alleviator shown in FIG. 1 illustrating the slosh alleviator approaching its terminal position with novel swirl alleviator structure disposed adjacent the tank discharge port; and FIG. 5 is a broken, part sectional view of a liquid container or tank employing spiral grooves for the guide therein of a modified form of the slosh and swirl alleviator of the present invention with the alleviator in its terminal position.

Referring now to the drawings wherein like numerals designate identical or corresponding parts throughout the several views, and more particularly to FIG. 1, there is shown a liquid container or tank 11 containing a liquid 12 therein. Tank 11 may be of any particular constant diameter configuration and may serve as the fuel tank for liquid propellant rockets, or the like, or for any other liquid tank which is adapted to be transported from one site to another and in which liquid slosh might prove a handicap to successful transportation thereof. In this FIGURE, a floating structure, designated by reference numeral 15, is disposed on the surface of liquid fuel 12 to comprise one form of the slosh alleviator system of the present invention. In actual operation, container 11 would initially be completely filled with fuel 12 and the floating structure 15 would be maintained against the top of the tank. However, to more clearly illustrate the present invention, the fuel level in tank 11 of FIG. 1 is shown at less than full capacity.

Tank 11 is provided with a plurality of longitudinally extending grooves extending throughout the length thereof and as designated by reference numerals 16, 17 and 18 for the three grooves shown in FIG. 1. The purpose of these grooves will be more clearly apparent as the description progresses.

Figure 2:
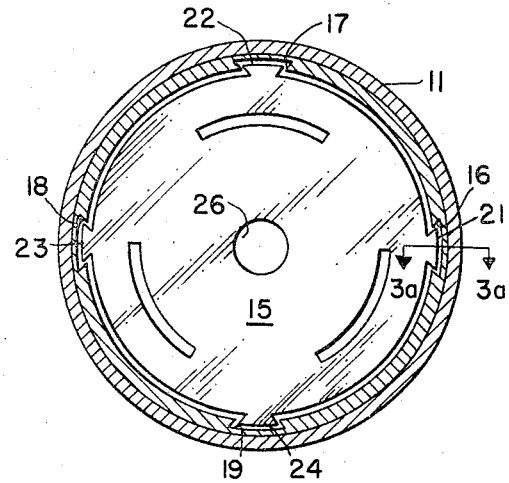
FIG. 2 is a section taken along lines 2—2 of FIG. 1.

Referring now to FIG. 2, a more complete appreciation and better understanding of the uses of grooves 16, 17, 18 and 19 will be readily apparent. As shown therein each of the grooves is constructed to accommodate a tab or integral projection extending from the circumference of float 15 with the tabs being designated respectively by reference numerals 21, 22, 23, and 24. The tab-groove combination serve to guide the movement of float 15 upon changing liquid levels in tank 11. Floating structure 15 is also provided with a central opening extending through the length thereof, as designated by reference numeral 26. Any particular material suitable for the purpose may be employed to construct floating structure 15, such for example, foamed plastics, metals, inflatable structures, or the like. The only essential requirements being that the material making up the composition of structure 15 must be buoyant and chemically inert to the liquid carried by the tank. As shown more particularly in FIG. 2, the floating surface of float 15 is designed so as to essentially conform in shape to the internal cross-sectional area of tank 11. The central opening 26 in float 15 may be of sufficient size to accommodate fuel or oxidizer lines that are adapted to pass through the center of tank 11, as so desired.

Figure 3A:
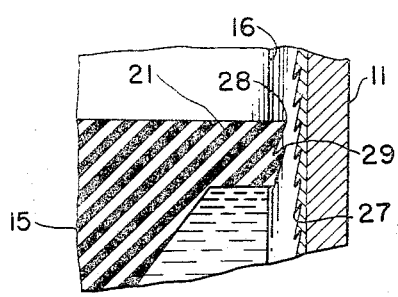
FIG. 3a is a view similar to FIG. 3 and showing an alternate form of the tank groove surface.
Figure 3:
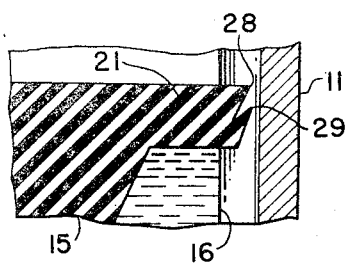
FIG. 3 is an enlarged section of one tab and tank groove for the slosh alleviator system shown in FIGS. 1 and 2 and taken along lines 3—3 of FIG. 2.

Referring now more particularly to FIG. 3, an enlarged part section of a single tab end structure and the adjacent groove coacting parts is shown. As shown in this figure, tab 21, illustrative of all the tab structures of float 15, is provided with a pair of angularly disposed teeth as designated by reference numerals 28 and 29, respectively. Teeth 28 and 29 are angularly directed in the upward direction and serve to bite against the groove sidewall when floating structure 15 is forced against the side of the groove and in an upward direction to thereby prevent sudden movement of the structure 15 in the upward direction. The remaining end tabs and grooves are of like construction and are not shown in the interest of simplicity. The tip portion of teeth 28 and 29 may also be provided with serrated surfaces, not shown, to insure better contact with the groove sidewall, when so desired.

When the groove walls are provided of a softer surface than that of the tabs, the teeth 28 and 29 will bite into the surface to prevent reverse movement of flotation unit 15. This would occur, for example, when the grooves are lined with a thin layer of relatively soft and chemically inert plastics, Teflon, or the like. The biting engagement of the teeth 28 and 29 would not be of such an extent to prevent movement of float 15 as the liquid level decreased further, however, since the suction forces of the liquid, as the level decreases, on flotation unit 15 would be sufficient to overcome any biting engagement of teeth 28 and 29. In most instances, however, the grooved sidewall will be less pliable than the tab teeth and teeth 28 and 29 will tend to flex and adhere to the sidewall, momentarily, to prevent reverse movement of the flotation unit.

From the above description, it is readily apparent that as the liquid level 12 is decreased in tank 11, floating structure 15 will be maintained on the liquid surface thereof in a floating condition to thereby alleviate any slosh movement that might be induced in liquid fuel 12 by shock-inducing forces that could be presented against the tank 11. Thus, as shock-inducing forces are applied to tank 11, due to sudden turning of the rocket vehicle, or the like, the liquid fuel 12 will be agitated or vibrated and will tend to slosh above the normal level thereof but any sloshing movement will have to force floating structure 15 out of its normal position to cause sloshing of the fuel. This movement of structure 15 is prevented by the tabs 21, 22, 23 and 24 thereon being cammed against and engaging the side of their respective grooves 16, 17, 18 and 19.

More specifically, referring to the embodiment illustrated in FIG. 3a, when tank 11 is subjected to shock-inducing forces during movement thereof, floating structure 15 will be cammed against the side of one or more of the grooves and the teeth 28 and 29, for example, will engage rack teeth 27 in the groove with any tendency of floating structure 15 being suddenly moved upwardly above the surface of the liquid being prevented by the engagement of these teeth and thereby serve to inhibit or damp any sloshing moment induced into liquid 12 by the shock-inducing forces.

Referring now more particularly to FIG. 4, the base portion of tank 11, its exit port 31 and discharge conduit 38 are shown. A pair of vertically extending projections or fingers 34 and 35 are disposed on diametrically opposed sides of exit port 31 and serve as swirl alleviating structure for this embodiment of the present invention. Fingers 34 and 35 may be of parallel, arcuate or any other suitable configuration, the only requirement being that the liquid in tank 11 is prevented from entering into the exit port 31 at all sides thereof. Inasmuch as projections 34 and 35 permit liquid entry only on diametrically opposed side areas of port 31, any swirling moment that might be induced into the liquid flow as it exits tank 11 is prevented. This is in contrast to the normal liquid action experienced when a liquid is drained from a container through a normal circular opening therein.

Fingers 34 and 35 are provided with individual supports 36 and 37, respectively, which serve also as a rest for floating structure 15 when the fuel level is diminished to such a degree that the floating structure will come in contact therewith. Central opening 26 in floating structure 15 or other suitable openings therein serve to receive fingers 34 and 35 prior to float 15 coming to rest on supports 36 and 37. Thus, it is readily seen that the liquid in tank 11 will be diverted from a normal swirling path into annular opening 31 to a dual sidewise entranceway into the port by the structure of fingers 34 and 35 and thereby prevent any undue swirling occurring in the liquid 12 as it is drained from tank 11. This elimination or reduction in swirl prevents any undesired turning moment being exerted on tank 11 during depletion of the fuel supply and thereby eliminates or minimizes what otherwise could be a serious impairment to a normal, long-term space mission when tank 11 is employed as a rocket fuel supply for a long-term space vehicle.

Referring now more particularly to FIG. 5, an alternate embodiment of the slosh and swirl alleviator of the present invention is shown. In this embodiment, a suitable fuel tank 41 is provided with a pair of spiral grooves along the length thereof as designated by reference numerals 42 and 43. The floating structure 45 is shown in its terminal position as it would be when all, or essentially all, of the fuel in tank 41 has been drained therefrom. Floating structure 45 is provided with a pair of diametrically opposed integral tabs 46 and 47 which are adapted to be maintained, respectively, in grooves 42 and 43 as the floating structure 45 moves along the length of tank 41 during changes in liquid fuel level therein. The pitch of grooves 42 and 43 are such that floating structure 45 makes less than one complete turn during movement from the top of tank 41 to the terminal portion thereof, the position shown in FIG. 5.

The base or depending structure extending from the floating surface of floating structure 45 is of tapered configuration with a plurality of wide, spiral grooves being disposed along the exterior surface thereof as designated by reference numeral 48. The pitch of grooves 48 is opposite to that of grooves 42 and 43. A suitable discharge conduit 52 is provided in connection with tank 41 at exit port 53 therein and serves to transfer the liquid in the tank to the utilization structure of the rocket motor or the like. As the liquid fuel is drained from tank 41, any slosh-induced forces exerted upon the tank will tend to cause agitation or turbulent movement of the liquid contained therein. This agitation is exerted against floating structure 45 which resists movement by the liquid and damps or reduces the tendency of the liquid to slosh above its normal level in the tank. A plurality of diametrically disposed perforations 54 are provided through the depending structure of float 45 to permit passage of liquid therethrough as the float moves with changing liquid levels. As in the previously described embodiment, in the normal drain of any liquid from a container through an annular orifice, there is a tendency of the liquid to undergo a swirling motion which can be highly disadvantageous in rocket flight and the like. In the present invention, this tendency of the liquid to swirl, although the direction of swirl cannot be predicted, will be transferred to the base of floating structure 45 wherein spiral grooves 48 therein will tend to convert the initial swirling motion in the direction of groove pitch. However, inasmuch as the pitch of grooves 42 and 43 are opposite to that of groove 48, and floating structure 45 will be turning in the direction of pitch of grooves 42 and 43 as the fuel supply is depleted, this swirling motion will be nullified or cancelled by the two coacting forces. Thus, no swirling will be imparted to the fuel tank and no correction is required in the flight program of the rocket vehicle of which tank 41 forms a part thereof. Although the pitch of grooves 42 and 43 is very slight, they offer sufficient resistance to reverse movement of floating structure 45 to damp or nullify any swirl mode in the liquid due to swirl inducing forces imparted to the liquid in tank 41.

From the above description, it is readily apparent that the invention described herein provides a system which greatly reduces the weight of previous baffle systems in liquid transporting containers and a system that is reliable in use and cheap and easy to manufacture and maintain in operative condition. Although specific materials have not been described for construction of tanks 11 and 41, it is readily apparent that any liquid container that is presently used to transport liquid from one site to another, and in which slosh-inducing forces might be important thereto, are readily adaptable for use with the present invention. In the same light, no specific material has been designated for the floating structures 15 and 45 described and shown herein, it being understood that any flotation material, such for example, inflatable structures or other buoyant means may be employed as the float units in the embodiments described with the only essential requirement being that the material used to construct the floats must, by the very nature of the systems to which they are to be employed, be chemically inert to the liquid on which the floating structures are adapted to be maintained.

In each of the embodiments of the present invention, the tanks are designed so that in the beginning operation thereof, the tanks may be completely filled with liquid fuel with the floating structure therein being maintained adjacent the top surface of the tank. As the liquid level decreases due to fuel consumption and the like, the liquid level will move away from the top of the tank structure creating a void which normally causes or presents an area that permits sloshing of the liquid fuel. The buoyant anti-slosh system of the present invention is maintained on the surface of the liquid at all levels and damps or inhibits any sloshing or swirling tendency by retarding all liquid motion, should the level surface of the liquid tend to become disturbed by sloshing or swirling modes.

Although the tank grooves have been shown and described as being formed integrally within the tank sidewalls, this is to be considered as illustrative only and not limiting on the invention. As will be readily apparent to those skilled in the art, in some instances it would be more economical and practical to form the grooves in a sleeve or similar structure to be inserted and fastened within the tanks. Where weight is a problem, as in liquid propellant tanks for rockets, the grooves may be formed with individual rod or bar members and these members secured within the tank to perform the dual function of groove guide mechanism and strengthening structure for the tank. Also, although a specific number of tabs and grooves are shown in each of the illustrative embodiments, it is to be understood that the invention is not so limited and any number, more than one, of tabs and corresponding groove structures is considered within the scope of the present invention. These and numerous other modifications and variations are considered possible in the light of the above teachings.

It is therefore to be understood that the invention may be practiced otherwise than as specifically described.

What is claimed as new and desired to be secured by Letters Patent of the United States is:

1. The combination of a liquid containing tank and mechanism to alleviate liquid slosh during movement of said tank from one site to another, the improvement therewith comprising:
   (1) floating means disposed within and having parts thereof conforming in shape substantially to the internal cross-sectional area of said tank,
   (2) guide means disposed in said tank and cooperating with said floating means and said tank to guide movement of said floating means upon change in liquid level in said tank and serving to maintain said floating means substantially level in said tank and to resist movement of said floating means above the level of said liquid when said liquid is agitated during tank movement,
   (3) said guide means including at least a pair of vertical grooves formed within said tank wall and tabs integrally formed on said floating means and equal in number to and slidably received by said grooves, said tabs being provided with notched ends adapted for engagement with said groove surfaces upon sloshing movement of said liquid surface to thereby resist movement of said floating means above the level of said liquid.

2. The combination of claim 1 wherein said tank is provided with a substantially central discharge port at the base thereof, stop means extending vertically from said tank base adjacent said discharge port, said floating means being provided with aperture means therein adapted to receive said stop means when the liquid level reaches a predetermined minimum, said stop means also serving to reduce swirl of the liquid as it passes through said discharge port.

3. The combination of claim 2 wherein said stop means includes at least a pair of fingers extending from said tank base, said fingers being of arcuate configuration and diametrically disposed about said discharge port.

4. The combination of claim 1 wherein said guide means includes at least a pair of spiral grooves within said tank wall and said tabs on said floating means being equal in number to and slidably received by said spiral grooves, said guide means serving to produce rotative movement to said floating means as the level of said liquid changes, and depending structure extending from the floating surface of said floating means into said liquid and serving to resist rotative movement of said floating means.

5. The combination of claim 4 wherein said depending structure tapers from said floating means to a substantially frusto conical point, said structure being provided with an external spiral grooved surface with the pitch of said grooved surface being opposite to the pitch of said spiral grooves within said tank.

6. The combination of claim 5 wherein said depending structure is provided with at least one diametric perforation therethrough.

7. The combination of claim 5 wherein said tank is provided with a substantially central discharge port at the base thereof and said point of said depending structure is adapted to engage said port when essentially all of the liquid has been drained from said tank.

References Cited
UNITED STATES PATENTS

| | | | |
|---|---|---|---|
| 1,294,265 | 2/1919 | Hirsch | 73—322.5 |
| 2,371,511 | 3/1945 | Faus. | |
| 1,533,138 | 4/1925 | Sokoloff et al. | 73—321 |
| 2,761,301 | 9/1956 | Tellier | 220—26 X |
| 2,840,259 | 6/1958 | Steidl | 220—22 |
| 3,049,261 | 8/1962 | Wade et al. | 220—26 |
| 3,294,278 | 12/1966 | Madden et al. | 220—93 |

FOREIGN PATENTS

| | | |
|---|---|---|
| 22,528 | 6/1948 | Finland. |
| 19,113 | 2/1911 | Great Britain |

LOUIS R. PRINCE, *Primary Examiner.*

D. M. YASICH, *Assistant Examiner.*

U.S. Cl. X.R.

73—322.5